United States Patent
Hashimoto et al.

(10) Patent No.: US 7,162,516 B2
(45) Date of Patent: Jan. 9, 2007

(54) INFORMATION PROCESSING APPARATUS, INFORMATION DISTRIBUTION APPARATUS, INFORMATION PROCESSING SYSTEM, NETWORK MONITORING APPARATUS AND NETWORK MONITORING PROGRAM

(75) Inventors: Hideyuki Hashimoto, Toyokawa (JP); Yoshikazu Ikenoue, Itami (JP); Hiroshi Sugiura, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 565 days.

(21) Appl. No.: 10/100,114

(22) Filed: Mar. 19, 2002

(65) Prior Publication Data

US 2002/0138597 A1 Sep. 26, 2002

(30) Foreign Application Priority Data

Mar. 22, 2001 (JP) ............................. 2001-083260

(51) Int. Cl.
G06F 15/16 (2006.01)
(52) U.S. Cl. ...................................... 709/208; 709/224
(58) Field of Classification Search ................ 709/223, 709/224, 225, 245, 217, 220, 232, 221, 200, 709/104, 208; 715/749; 707/10, 3, 102; 340/539, 903
See application file for complete search history.

(56) References Cited

U.S. PATENT DOCUMENTS

| 4,471,348 | A | * | 9/1984 | London et al. ............... 345/2.2 |
| 5,382,943 | A | * | 1/1995 | Tanaka .................. 340/539.22 |
| 5,572,674 | A | * | 11/1996 | Ernst ........................... 709/221 |
| 5,678,024 | A | * | 10/1997 | Wagar et al. ............... 711/129 |
| 5,862,339 | A | * | 1/1999 | Bonnaure et al. ........... 709/227 |
| 5,896,292 | A | * | 4/1999 | Hosaka et al. ............... 700/108 |
| 5,945,985 | A | * | 8/1999 | Babin et al. ............. 715/500.1 |
| 5,950,006 | A | * | 9/1999 | Crater et al. ................. 717/140 |
| 6,038,556 | A | * | 3/2000 | Hutchison ..................... 706/25 |
| 6,070,190 | A | * | 5/2000 | Reps et al. ................. 709/224 |
| 6,101,508 | A | * | 8/2000 | Wolff .......................... 709/223 |
| 6,104,392 | A | * | 8/2000 | Shaw et al. ................. 715/749 |
| 6,112,239 | A | * | 8/2000 | Kenner et al. .............. 709/224 |
| 6,154,744 | A | * | 11/2000 | Kenner et al. ................ 707/10 |
| 6,208,658 | B1 | * | 3/2001 | Pickett ....................... 370/401 |

(Continued)

FOREIGN PATENT DOCUMENTS

JP 10-133524 5/1998

(Continued)

OTHER PUBLICATIONS

A Multilevel Approach to Intelligent Information Filtering.—Mostafa (1997) www.cs.rmit.edu.au/~vc/cs436/p368-mostafa.pdf.*

(Continued)

Primary Examiner—Thong Vu
(74) Attorney, Agent, or Firm—Buchanan Ingersoll & Rooney, PC (57) ABSTRACT

An information acquiring unit checks operation command information issued to the multiple information processing apparatuses over the network in order to understand the totality of the operation command information in the network. The state of utilization of each information processing apparatus is analyzed based on the operation command information. Where a utilization state analyzing unit is provided in an information processing apparatus, the utilization state analyzing unit also checks the state of utilization of its own information processing apparatus. Prompt information that prompts the issuance of operation commands to an underutilized information processing apparatus is then issued. Consequently, the level of utilization of that information processing apparatus may be increased.

11 Claims, 6 Drawing Sheets

U.S. PATENT DOCUMENTS

| | | | |
|---|---|---|---|
| 6,232,887 B1* | 5/2001 | Carson | 340/903 |
| 6,370,182 B1* | 4/2002 | Bierly et al. | 375/140 |
| 6,370,573 B1* | 4/2002 | Bowman-Amuah | 709/223 |
| 6,381,599 B1* | 4/2002 | Jones et al. | 707/5 |
| 6,397,221 B1* | 5/2002 | Greef et al. | 707/102 |
| 6,401,117 B1* | 6/2002 | Narad et al. | 709/223 |
| 6,405,255 B1* | 6/2002 | Stoltz et al. | 709/231 |
| 6,421,726 B1* | 7/2002 | Kenner et al. | 709/225 |
| 6,430,595 B1* | 8/2002 | Ferguson et al. | 709/200 |
| 6,430,613 B1* | 8/2002 | Brunet et al. | 709/223 |
| 6,434,343 B1* | 8/2002 | Kobayashi et al. | 399/8 |
| 6,442,547 B1* | 8/2002 | Bowman-Amuah | 707/10 |
| 6,480,918 B1* | 11/2002 | McKenney et al. | 710/200 |
| 6,490,620 B1* | 12/2002 | Ditmer et al. | 709/224 |
| 6,502,125 B1* | 12/2002 | Kenner et al. | 709/203 |
| 6,526,044 B1* | 2/2003 | Cookmeyer et al. | 370/352 |
| 6,542,739 B1* | 4/2003 | Garner | 455/427 |
| 6,571,285 B1* | 5/2003 | Groath et al. | 709/223 |
| 6,665,716 B1* | 12/2003 | Hirata et al. | 709/224 |
| 6,693,915 B1* | 2/2004 | Lappetelainen et al. | 370/468 |
| 6,799,221 B1* | 9/2004 | Kenner et al. | 709/245 |
| 6,836,800 B1* | 12/2004 | Sweet et al. | 709/224 |
| 6,961,727 B1* | 11/2005 | McBrearty et al. | 707/10 |
| 6,985,941 B1* | 1/2006 | Schweitzer et al. | 709/224 |
| 2002/0046030 A1* | 4/2002 | Haritsa et al. | 704/256 |
| 2002/0049803 A1* | 4/2002 | Bandhole et al. | 709/104 |
| 2002/0065725 A1* | 5/2002 | Manabe et al. | 705/16 |
| 2002/0138597 A1* | 9/2002 | Hashimoto et al. | 709/220 |
| 2002/0152304 A1* | 10/2002 | Collazo | 709/224 |
| 2003/0120745 A1* | 6/2003 | Katagishi et al. | 709/217 |
| 2003/0154387 A1* | 8/2003 | Evans et al. | 713/193 |
| 2003/0217052 A1* | 11/2003 | Rubenczyk et al. | 707/3 |
| 2003/0229514 A2* | 12/2003 | Brown | 705/2 |
| 2004/0078276 A1* | 4/2004 | Shimogori | 705/26 |
| 2004/0093254 A1* | 5/2004 | Hirata et al. | 705/8 |
| 2005/0289046 A1* | 12/2005 | Conyack, Jr. | 705/38 |
| 2006/0015638 A1* | 1/2006 | Holzhauser et al. | 709/232 |

FOREIGN PATENT DOCUMENTS

| | | |
|---|---|---|
| JP | 11-275291 | 10/1999 |
| JP | 2000-049902 | 2/2000 |
| JP | 2000-124926 | 4/2000 |

OTHER PUBLICATIONS

Compositional Verification of Agents in Dynamic..—Jonker, Treur, de Vries (1998) sunsite.informatik.rwth-aachen.de/Publications/CEUR-WS/Vol-16/09-jonker.pdf.*

Data communications and management of a distributed network of automated data acquisition and analysis systems Mckinnon, A.D.; Hubbard, C.W.; Nuclear Science Symposium, 1997. IEEE Nov. 9-15, 1997 pp. 730-733 vol. 1.*

SNMP agent support for SMDS Cox, T.A.; Piscitello, D.M.; Tesink, K.; Network, IEEE vol. 5, Issue 5, Sep. 1991 pp. 33-40.* generic network management architecture targeted to support home automation networks and home Internet connectivity Topalis, E.; Orphanos, G.; Koubias, S.; Papadopoulos, G.; Consumer Electronics, IEEE Transactions on vol. 46, Issue 1, Feb. 2000 pp. 44-51.*

Operational benefits of an advanced computerized procedures system□□Lipner, M.K.; Kerch, S.P.;□□Nuclear Science Symposium and Medical Imaging Conference, 1994., 1994 IEEE Conference Record□□vol. 3, Oct. 30-Nov. 5, 1994 pp. 1068-1072 vol. 3.*

* cited by examiner

INFORMATION PROCESSING APPARATUS, INFORMATION DISTRIBUTION APPARATUS, INFORMATION PROCESSING SYSTEM, NETWORK MONITORING APPARATUS AND NETWORK MONITORING PROGRAM

CROSS-REFERENCE TO RELATED APPLICATIONS

This application is based on application No. 2001-83260 filed in Japan, the contents of which is hereby incorporated by reference.

BACKGROUND OF THE INVENTION

1. Field of the Invention

This invention relates to a network monitoring system that monitors the state of utilization of information processing apparatuses connected to a network, as well as to the program used thereby, and more particularly, to an information processing system in which operation command information is issued from an information distribution apparatus and is received by one of the information processing apparatuses over a network and processing is performed based on such information, and in which appropriate utilization of each information processing apparatus is ensured, as well as to an information processing apparatus, information distribution apparatus, network monitoring apparatus and network monitoring program included in such information processing system.

2. Description of the Related Art

Information processing apparatuses such as scanners and printers are conventionally used while connected to a network. Various technologies have been proposed using which the information regarding the state of utilization of these apparatuses is obtained. For example, Japanese Laid-Open Patent Application H11-275291 discloses a technology to obtain information regarding the state of utilization of scanners, for example, and to select an available machine. Furthermore, Japanese Laid-Open Patent Application H10-133524 discloses a technology to manage the operation of printers. In addition, Japanese Laid-Open Patent Application 2000-49902 discloses a technology in which in the event of a circuit failure or a recovery of such failure, the contents of such failure or recovery is notified via e-mail.

However, using the conventional art described above, it has not been possible to provide appropriate measures to address an imbalance in the state of utilization among the apparatuses. Therefore, the situation has occurred in which the capabilities of each apparatus are not fully utilized.

OBJECTS AND SUMMARY

The present invention was created in order to resolve the problems with the conventional art described above. An object of the present invention is to provide an information processing system in which operation command information is issued by an information distribution apparatus and received by one of the information processing apparatuses over a network and processing is performed based on such information, and in which appropriate utilization of each information processing apparatus is ensured, as well as to an information processing apparatus, information distribution apparatus, network monitoring apparatus and network monitoring program included in such information processing system.

A first aspect of the present invention comprises an information processing apparatus that receives operation command information from a network and performs processing based on such information, wherein the information processing apparatus includes a first information acquiring unit that obtains first information regarding operation commands supplied to multiple information processing apparatuses connected to the network, a second information acquiring unit that obtains second information regarding the utilization of the information processing apparatus in which it resides, and an information sending unit that, based on the first information obtained by the first information acquiring unit and the second information obtained by the second information acquiring unit, transmits prompt information that prompts an issuance of an operation command directed to the information processing apparatus in which it resides.

A second aspect of the present invention comprises an information distribution apparatus that sends operation command information to a group of information processing apparatuses over a network and causes processing to be performed based on such information, wherein the information distribution apparatus includes an information acquiring unit that obtains information regarding operation commands supplied by the information distribution apparatus to the multiple information processing apparatuses over the network, a utilization state analyzing unit that analyzes the state of utilization of the multiple information processing apparatuses based on the information obtained by the information acquiring unit, a determining device that identifies which information processing apparatus is underutilized based on the results of the analysis by the utilization state analyzing unit, and an information sending unit that sends prompt information that prompts an issuance of an operation command to the underutilized information processing apparatus identified by the determining device.

A third aspect of the present invention comprises a network monitoring apparatus that monitors the network that connects the information distribution apparatus that issues operation command information with the group of information processing apparatuses that receive operation command information and perform processing based on such information, wherein the network monitoring apparatus includes an information acquiring unit that obtains operation command information supplied to the multiple information processing apparatuses connected to the network, a utilization state analyzing unit that analyzes the state of utilization of the multiple information processing apparatuses based on the information obtained by the information acquiring unit, a determining device that identifies which information processing apparatus is underutilized based on the results of the analysis by the utilization state analyzing unit, and an information sending unit that sends prompt information that prompts an issuance of an operation command to the underutilized information processing apparatus identified by the determining unit.

A fourth aspect of the present invention comprises an information processing system in which operation command information is issued by an information distribution apparatus and received by one of the information processing apparatuses over a network and processing is performed based on such information, wherein the information processing system includes an information acquiring unit that obtains operation command information supplied to the multiple information processing apparatuses by the information distribution apparatus over the network, a utilization state analyzing unit that analyzes the state of utilization of the multiple information processing apparatuses based on the information obtained by the information acquiring unit, a determining device that identifies which information processing apparatus is underutilized based on the results of the analysis by the utilization state analyzing unit, and an information sending unit that sends prompt information that prompts an issuance of an operation command to the underutilized information processing apparatus identified by the determining unit.

In other words, the information acquiring unit checks operation command information issued to the multiple information processing apparatuses over the network in order to understand the totality of the operation command information (regardless of destination) in the network. The state of utilization of each information processing apparatus is analyzed based on this operation command information. Where the device that includes the utilization state analyzing unit and other means is an information processing apparatus, it also checks the state of its own utilization. Prompt information that prompts the issuance of operation commands to an underutilized information processing apparatus is then issued. Consequently, the level of utilization of that information processing apparatus may be increased.

The prompt information may be issued to any apparatus that is connected to the information network or to an apparatus outside the information network (such as the service center that maintains and manages the information processing apparatuses).

The embodiments also have the following features.

(a) A configuration information acquiring unit that obtains the configuration information that pertains to the capabilities of the underutilized information processing apparatus identified as described above and is recognized by the network is included, and the prompt information sent by the sending unit includes correction information to correct the configuration information when the configuration information obtained by the configuration information acquiring unit contains errors.

Where an underutilized information processing apparatus exists, the underutilization may be the result of erroneous recognition by the information network with regard to the capabilities of that information processing apparatus. For example, let us assume that an information processing apparatus is recognized as a monochrome printer by the information network even though it is actually a color printer. In such a case, due to such incorrect recognition, color print operation command information does not arrive at the color printer. When this occurs, it can be expected that if the configuration information is corrected, the level of utilization of this information processing apparatus will increase.

(b) The prompt information sent by the information sending unit includes message information by which to cause a different apparatus connected to the network to display a message that urges the use of the underutilized information processing apparatus.

Where an underutilized information processing apparatus exists, the underutilization may occur because the information processing apparatus has a low priority in the information network. In addition, where the operator selects an information processing apparatus each time printing is required via the apparatus from which operation command information is issued, it is possible that the operator has forgotten the existence of the particular information processing apparatus. Such a situation may be corrected by sending message information. Here 'a different apparatus' refers to an information distribution apparatus or an information network monitoring apparatus as well as the personal computer that is used to create the operation command information. In addition, where operation command information can be forwarded from one information processing apparatus to another, the term also refers to another information processing apparatus.

(c) An other apparatus information acquiring unit that obtains information regarding the capabilities of another information processing apparatus connected to the network is also included.

(d) The information sending unit creates, from the information obtained by the other apparatus information acquiring unit, capability difference information that indicates the differences in capability between the other information processing apparatus and the underutilized information processing apparatus, and sends this capability difference information as prompt information.

(e) The information sending unit creates, from the information obtained by the other apparatus information acquiring unit, additional device information by which to upgrade the performance of the underutilized information processing apparatus to a level equivalent to that of the other information processing apparatus, and sends this additional device information as prompt information.

Where information regarding capabilities that are missing in the 'underutilized information processing apparatus' are included in the information obtained by the other apparatus information acquiring unit, the prompt information may be made to comprise the additional capability information that urges the addition of the missing capabilities.

Where an underutilized information processing apparatus exists, the underutilization may be the result of the insufficient capability of that information processing apparatus to handle the load imposed by the many operation commands existing in the information network. For example, such a situation may comprise a situation in which most of the commands require post-printing processing (such as folding and stapling), while the subject information processing apparatus lacks that capability. In that case, due to the insufficient capability possessed by the subject information processing apparatus, the apparatus may receive very few operation commands. In such a case, it is expected that if this missing capability is added to the information processing apparatus, its utilization will thereafter increase.

It is naturally preferred that the 'other information processing apparatus' regarding which the other apparatus information acquiring unit obtains capability information comprise an apparatus that is highly utilized. In such a case, the capabilities demanded by the operation command information on the information network can be more accurately understood.

A fifth aspect of the present invention comprises a network monitoring program that manages a network to which are connected an information distribution apparatus that issues operation command information and a group of information processing apparatuses that receive operation command information and perform processing based on such information, wherein the network monitoring program includes a step of obtaining operation command information supplied to the multiple information processing apparatuses connected to the network, a step of analyzing the state of utilization of the multiple information processing apparatuses based on the obtained information, a step of identifying based on the results of the analysis an underutilized information processing apparatus and a step of issuing prompt information that prompts an issuance of an operation command to the identified underutilized information processing apparatus.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Embodiments of the present invention are described in detail below with reference to the accompanying drawings. These embodiments each comprise a system that includes multiple printers connected to a network and causes printing to be performed by one of the printers based on an instruction from a client. The present invention is applied therein.

[First Embodiment]

Figure 1:
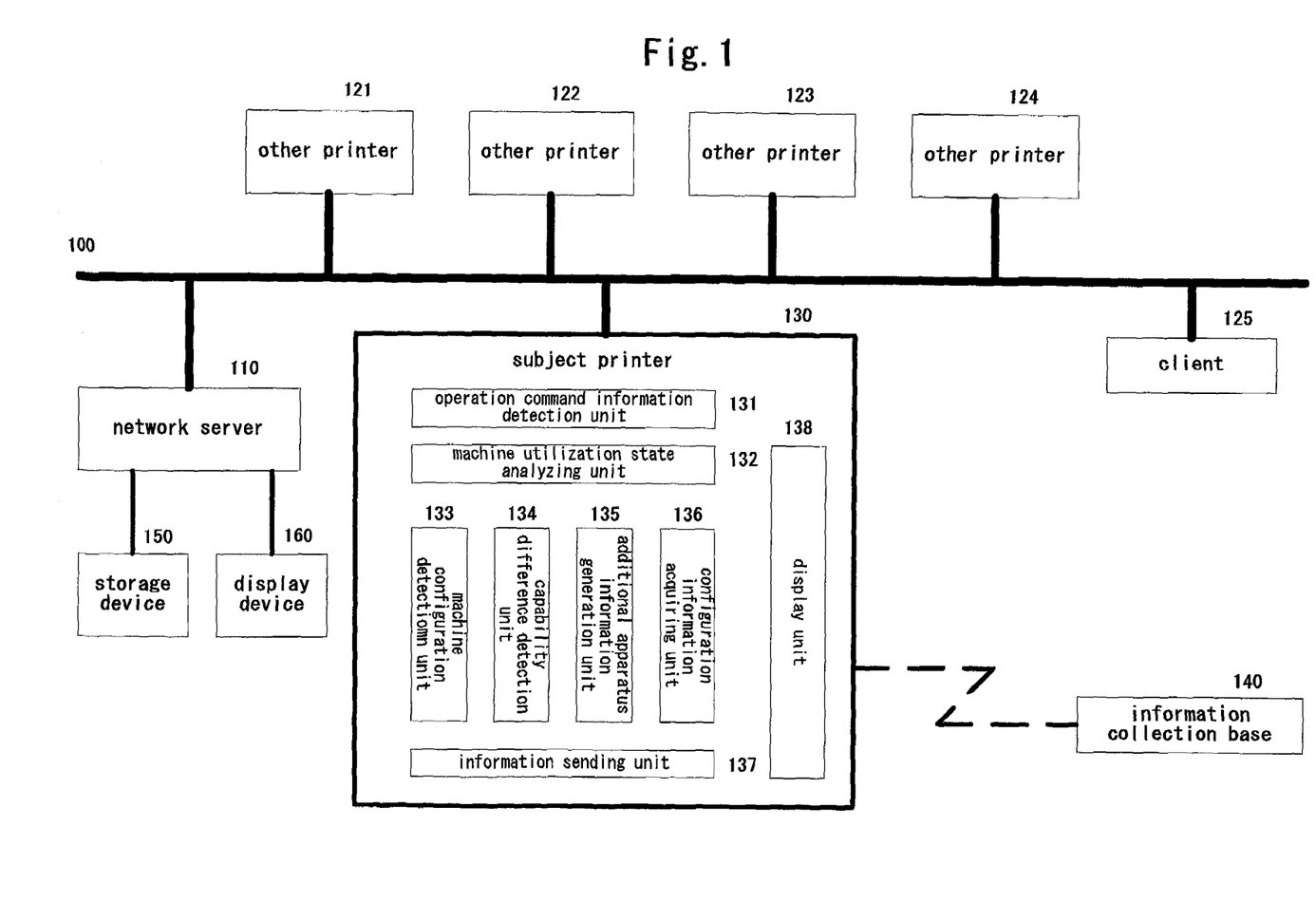
FIG. 1 is a block diagram of an information network monitoring system pertaining to a first embodiment.

The system pertaining to a first embodiment has the construction shown in FIG. 1. This system comprises a subject printer 130 and other printers 121 through 124, a client 125 and a network server 110, all of which are connected to a network 100. There may be multiple clients 125, and the number of printers may be any number that is two or more.

The subject printer 130 includes an operation command information detection unit 131, a machine utilization state analyzing unit 132, a machine configuration checking unit 133, a capability difference detection unit 134, an additional apparatus information generating unit 135, a configuration information acquiring unit 136, an information sending unit 137 and a display unit 138. The operation command information detection unit 131 monitors whether or not operation command information exists in the network 100. The machine utilization state analyzing unit 132 detects the printer to which operation command information was sent among the printers connected to the network 100. The machine configuration checking unit 133 checks the configuration information regarding the subject printer connected to the network 100. The configuration information acquiring unit 136 obtains from the network server 110 the configuration information for the other printers connected to the network 100. Configuration information is information regarding the configuration of the apparatus, as described below. The capability difference detection unit 134 detects the differences between the subject printer 130 and another printer connected to the network 100. The additional apparatus information generating unit 135 generates additional apparatus information necessary to upgrade the performance of the subject printer 130 to a level equivalent to that of the other printer. The information sending unit 137 sends the generated additional apparatus information to an external information collection base 140. The display unit 138 displays use promotion information and option installation prompt information for the printer. Here, the external information collection base 140 comprises a department that is responsible for the maintenance of the system, a central management center, a printer manufacturer or the like.

The network server 110 manages the printers and clients connected to the network 100. The network server 110 therefore maintains information regarding the configuration of each printer. 'Configuration information' refers to whether the printer is capable of color printing, the sizes of paper that can be used, whether the printer is capable of post-printing processing, and the types of the available post-printing processing. The network server 110 includes a storage device 150 in which to store the configuration information for each printer and a display device 160 on which to display such information.

The printers connected to the network 100 are managed based on a standard network management protocol. Operation command detection information, printer configuration information, capability difference information and additional apparatus information are registered in the database used by the network management protocol, and are managed on an individual printer basis using an identifier. As the standard network management protocol, SNMP (Simple Network Management Protocol), which is a TCP/IP network management protocol, may be used, for example. As the database, if SNMP is used, MIB (Management Information Base) may be used. Naturally, a different network management protocols may be used instead so long as it is capable of network management.

The operation of this system will now be explained. The basic operation of this system is the operation to cause printing to be performed by one of the printers based on a request from the client 125. More specifically, a print command is sent to the network server 100 from the client 125. The network server 110 then sends the operation command information to the designated printer. The printer that receives the operation command performs printing based on the contents of the command. Where the utilization level of the subject printer 130 is inappropriately low, the subject printer 130 carries out processing to urge that a print command be addressed to itself.

The control regarding this processing carried out by the subject printer 130 will now be explained with reference to the flow chart of FIG. 4. The operation command detection unit 131 first monitors the network 100 for operation command information (S401). As used here, 'operation command information' comprises a print command issued by the client 125 to one of the printers, as well as related data. Operation command information is registered in the database based on the network management protocol. Therefore, the operation command information detection unit 131 can learn the utilization state of each printer. Where operation command information is found (YES in S401), the machine utilization state analyzing unit 132 determines the printer to which the operation command was issued. Furthermore, the utilization state of each printer connected to the network 100 is also analyzed (S402). It is then determined whether or not the subject printer 130 itself is operating (S403). Where the subject printer 130 is operating (YES in S403), the processing of S401 is returned to and monitoring for operation command information is carried out. Where the subject printer 130 is not operating (NO in S403), the configuration information for the subject printer 130 is obtained from the network server 110 (S404). That is, the subject printer 130 checks the network for its own configuration.

The machine configuration checking unit 133 then checks to determine whether or not the configuration information obtained for the subject printer 130 is incorrect. Where it is determined as a result of the check that incorrect information exists (NO in S405), correct configuration information is created and sent to the network server 110 (S406). Notification that the configuration information was erroneous may also be sent to the external information collection base 140. The error described here does not refer to physical failures of the printer itself, such as lack of paper or a paper jam, but rather concerns the capabilities of the printer, i.e., the settings regarding high-speed printing, post-print processing capabilities, settings regarding color printing, settings regarding usable paper sizes and the like. Namely, it refers to whether the settings are correctly entered so as to enable the network 100 to correctly recognize the capabilities of the subject printer 130, or so as to enable the printer to be fully utilized to its maximum capability.

Where the configuration information is not erroneous, i.e., where the subject printer 130 is correctly recognized by the network 100 (YES in S405), a message prompting the use of the subject printer 130 is sent to the network server 110 (S407), and the network server 110 receiving the message displays it on the display device 160. The message may also be sent to the client 125, or displayed on the transmission display unit 138 of the subject printer 130.

The configuration information acquiring unit 136 then obtains from the network server 110 the configuration information for the printer among the printers 121 through 124 that is operating (S408). Based on the obtained configuration information, the capability difference detection unit 134 detects any differences between the configuration information for this printer and the subject printer 130, and creates capability difference information (S409). As used here, the term 'capability difference' refers to differences in capability between the subject printer 130 and the other printer, such as that only one of the printers has a particular capability. Therefore, a situation in which both printers have the same capabilities but are differently configured when compared is precluded. Specifically, if the other printer is a color printer while the subject printer 130 is a monochrome printer, the color printing capability is recognized as a capability difference.

The additional apparatus information generating unit 135 then creates information regarding an additional apparatus that is necessary in order to upgrade the performance of the subject printer 130, which is not operating, to a level equivalent to that of the other printer, which is operating (S410). In the case of the example above, information stating that a color printing capability is needed is created. Finally, the capability difference information and additional apparatus information thus created are sent to the external information collection base 140 and the network server 110 (S411), whereupon the routine is ended. The processing to analyze the printer utilization state (S402) is performed approximately once per day, such as at the end of the business day.

As described in detail above, in this embodiment, the state of utilization of each printer connected to the network 100 is checked by the operation command information detection unit 131 and the machine utilization state analyzing unit 132. Where the utilization level of the subject printer 130 is low, the machine configuration checking unit 133 performs processing to verify the configuration information for the subject printer 130 and prompt the use of the subject printer 130.

Where an error is contained in the configuration information for the subject printer 130, the capability difference unit 134, additional apparatus information generating unit 135 and configuration information acquiring unit 136 perform processing to communicate this fact.

Figure 4:
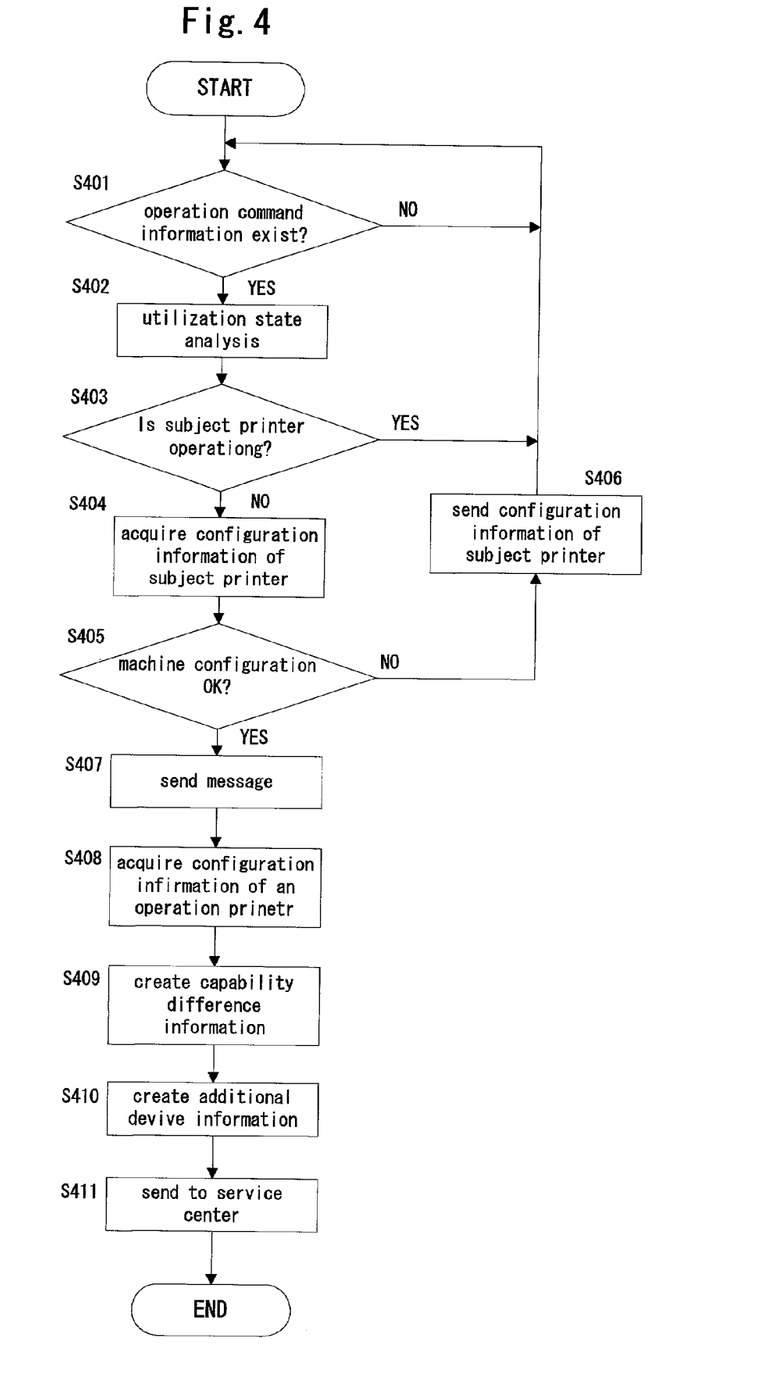
FIG. 4 is a flow chart of an information processing apparatus pertaining to the first embodiment.

Specifically, it may be expected that the configuration of the subject printer 130 can be correctly recognized through the transmission of the printer configuration information carried out in S406 of FIG. 4. It may be therefore expected that operation commands not sent to the subject printer 130 due to the erroneous recognition will begin to be sent thereafter. In addition, the user can learn via the prompt message sent in S407 that the subject printer 130 can be utilized more intensively. Consequently, it may be expected that the user will make a conscious effort to send operation commands to the subject printer 130 in the future. Furthermore, based on the transmission of capability difference information carried out in S411, the person or section responsible for printer maintenance can recognize the missing capabilities of the subject printer 130. Consequently, it may be expected that measures will be taken regarding the subject printer 130 in order to increase its utilization rate. Through this processing, an information network monitoring program and information processing apparatus that ensure appropriate utilization of the subject printer 130 are realized in an information processing system in which operation command information is received over a network 100 and processing is performed based on that information.

[Second Embodiment]

Figure 2:
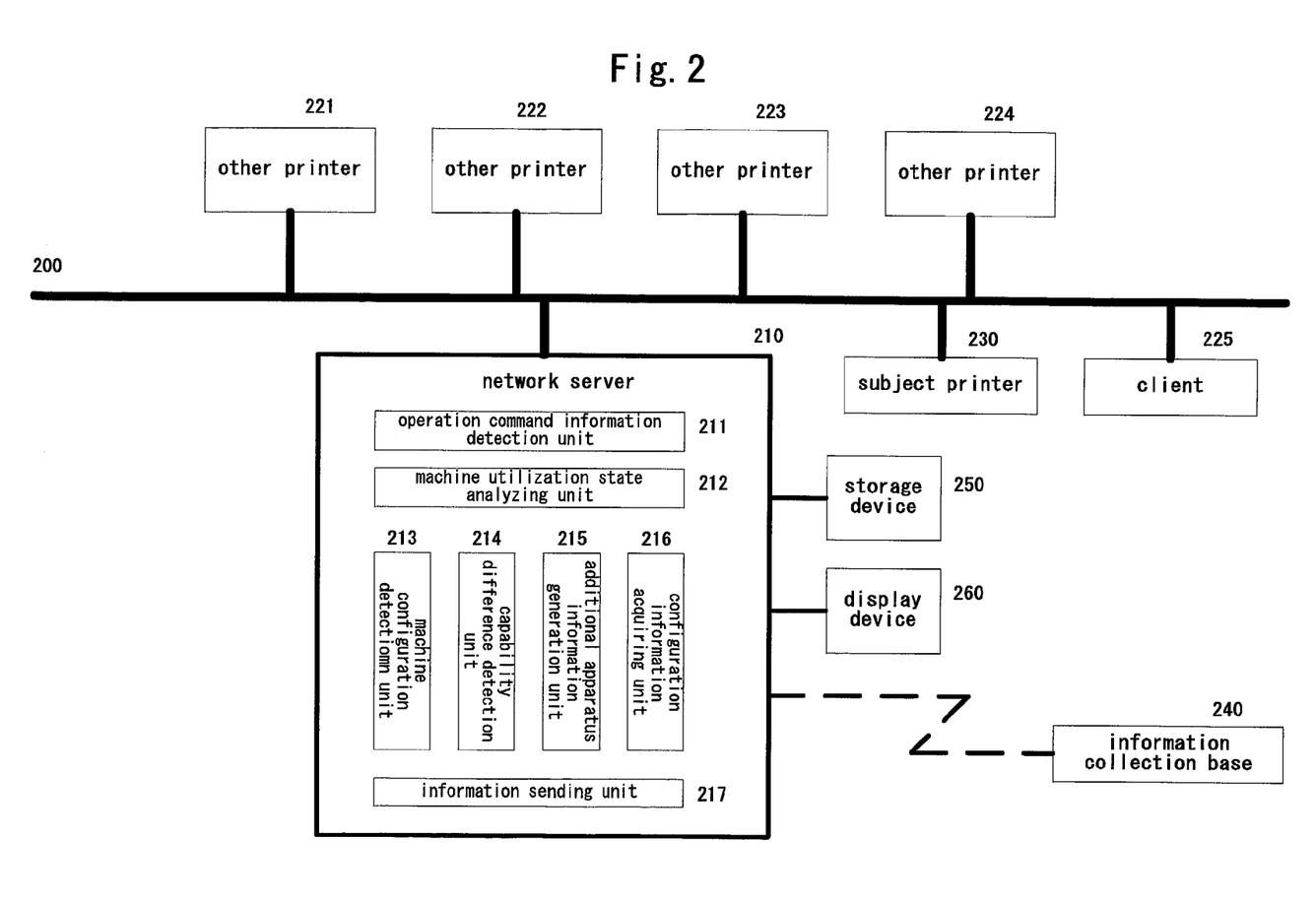
FIG. 2 is a block diagram of an information network monitoring system pertaining to a second embodiment.

The system pertaining to a second embodiment has the construction shown in FIG. 2. Overall, the system pertaining to this embodiment has essentially the same hardware construction as the first embodiment shown in FIG. 1, except that the operation command information detection unit 211, machine utilization state analyzing unit 212, machine configuration checking unit 213, capability difference detection unit 214, additional apparatus information generating unit 215, configuration information acquiring unit 216 and information sending unit 217 are located in the network server 210. These components were located inside the subject printer 130 in the first embodiment. The difference in operation from the first embodiment is that while in the first embodiment the execution of the information network monitoring program was performed by the subject printer 130, which comprises an information processing apparatus, in this embodiment it is performed by the network server 210, which comprises an information distribution apparatus.

The operation of this embodiment will now be explained. The basic operation of this embodiment also involves printing by one printer based on a request from the client 225. However, unlike the first embodiment, the processing in which the underutilized printer in the network 200 is identified and the issuance of print commands to this printer are carried out by the network server 210.

Figure 5:
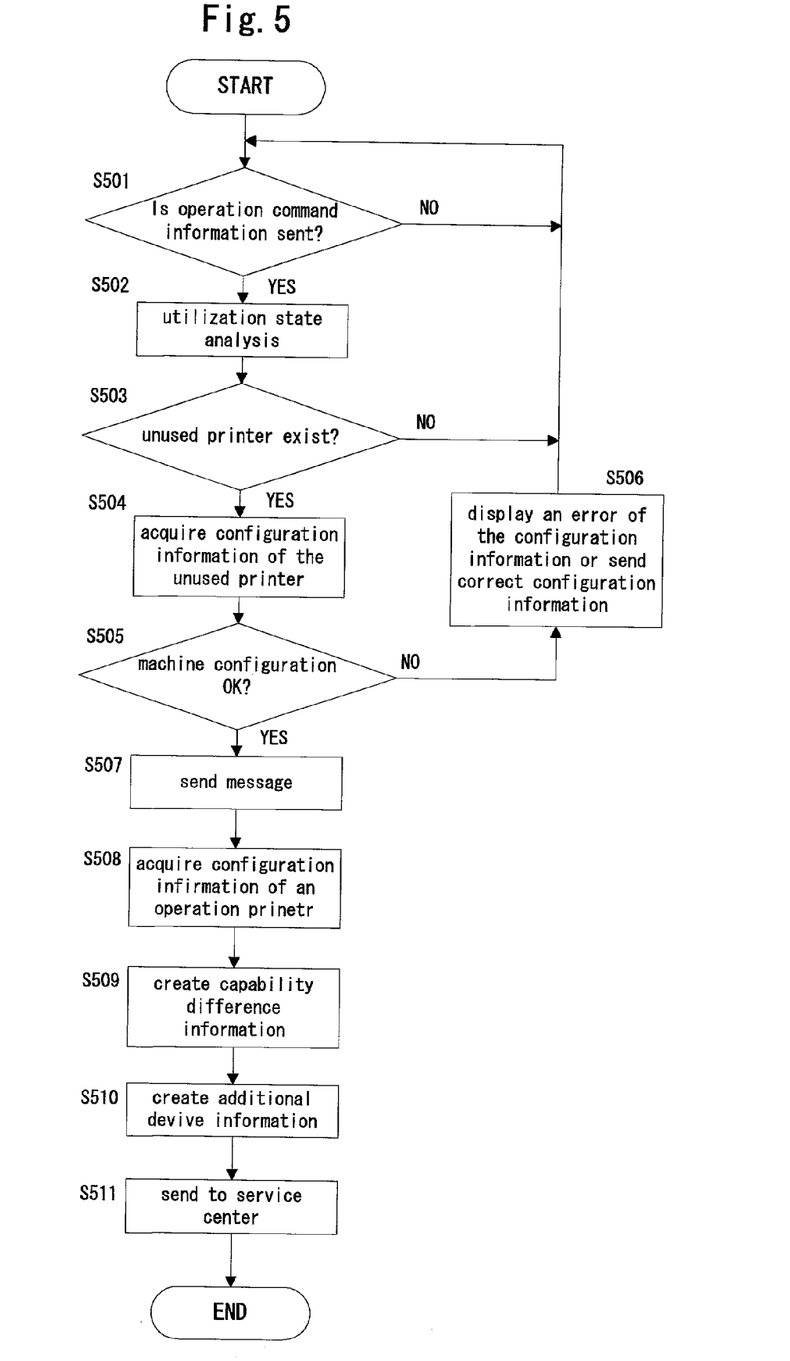
FIG. 5 is a flow chart of an information distribution apparatus pertaining to the second embodiment.

The control of this processing by the network server 210 will now be explained with reference to the flow chart of FIG. 5. The network server 210 first checks each printer connected to the network 200 on a periodic basis to obtain the hardware information, settings information, state information, etc. regarding each printer, and stores the information in the storage device 250. The operation command detection unit 211 checks whether or not the network server 210 has sent operation command information to the network 200 (S501). As used here, the term 'operation command information' refers to the print command and data associated therewith that were issued by the client 225. Where operation command information was issued (YES in S501), the machine utilization state analyzing unit 212 analyzes the utilization state of each printer connected to the network 200 (S502).

It is then determined whether or not an unused printer exists (S503). Where all of the printers are in use (NO in S503), the processing of S501 is returned to, and the network server 210 checks whether or not an operation command information has been issued. Where an unused printer exists (YES in S503), the network server 210 advances to S504. In this step, the printer identified as not in use is determined to be the underutilized printer. In the explanation provided below, it is assumed that the printer not in use is the subject printer 230. In S504, the configuration information for the subject printer 230 is obtained from the storage device 250.

The machine configuration checking unit 213 checks whether or not the configuration information obtained for the subject printer 230 is erroneous. Where the configuration information is determined to be erroneous after checking (NO in S505), that fact is displayed on the display device 260 (S506). The fact that the information contains an error may also be sent to the external information collection base 240.

Where the configuration information does not contain an error, i.e., where the capabilities of the subject printer 230 are correctly recognized by the network 200 (YES in S505), a message that prompts the use of the subject printer 230 is displayed on the display device 260 (S507). The message may also be sent to the unused subject printer 230, or to the client 225.

The configuration information acquiring unit 236 then obtains the configuration information regarding a printer currently in use among the printers 221 through 224 (S508). Based on the obtained configuration information, the capability difference detection unit 214 detects the capability differences regarding the printer in use from the configuration information for the currently unused subject printer 230, and creates capability difference information (S509). Furthermore, the additional apparatus information generating unit 215 creates information regarding additional apparatuses necessary in order to upgrade the performance of the unused subject printer 230 to a level equivalent to that of the other printer currently in use (S510). Finally, the thus-created capability difference information and additional apparatus information are sent to the external information collection base 240 (S511), whereupon the processing ends. The analysis of the utilization state of the printers (S502) is performed approximately once per day, as in the first embodiment.

As described in detail above, in this embodiment, the operation command information detection unit 211 and the machine utilization state analyzing unit 212 check the utilization state of each printer in the network 200. Where a particular printer is not being used, the machine configuration checking unit 213 performs processing to verify the configuration information for that printer and prompt the promotion of the use thereof. Where the printer configuration information is erroneous, the capability difference detection unit 214, additional apparatus information generating unit 215 and configuration information acquiring unit 216 perform processing to communicate that fact. Specifically, the same effect as described with reference to the first embodiment may be expected through the processing of steps S506, S507 and S511 of FIG. 5. Through this processing, an information network monitoring program and information distribution apparatus that ensure appropriate utilization of each printer in the network 200 is realized in an information processing system in which operation command information is received over a network 200 and processing is performed based on that information.

[Third Embodiment]

Figure 3:
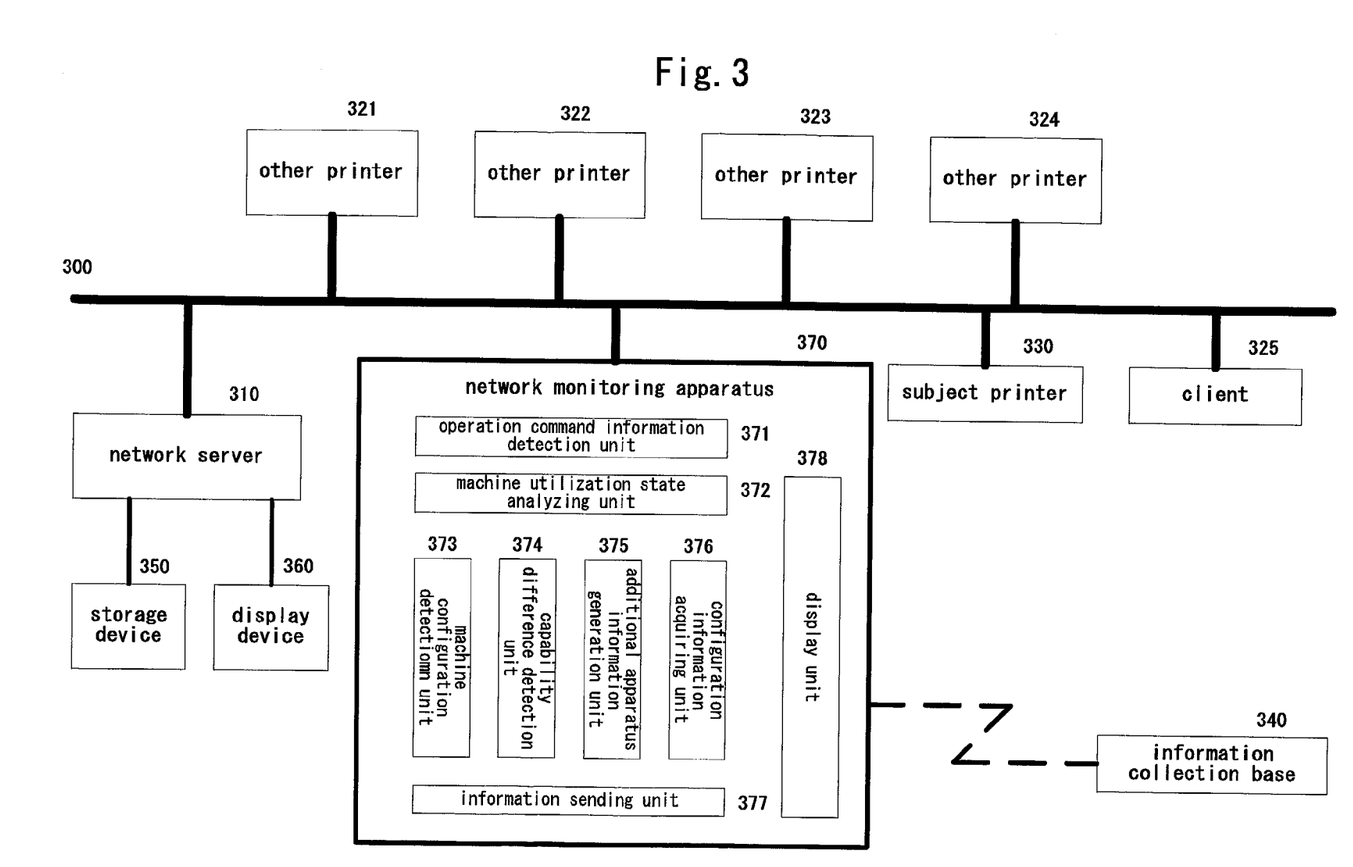
FIG. 3 is a block diagram of an information network monitoring system pertaining to a third embodiment.

The system pertaining to a third embodiment has the construction shown in FIG. 3. Overall, the system pertaining to this embodiment has essentially the same hardware construction as the first embodiment shown in FIG. 1, except that (i) it includes an information network monitoring apparatus 370, which is a dedicated device to execute the information network monitoring program, and (ii) the operation command information detection unit 371, machine utilization state analyzing unit 372, machine configuration checking unit 373, capability difference detection unit 374, additional apparatus information generating unit 375, configuration information acquiring unit 376 and information sending unit 377 are located inside this information network monitoring apparatus 370. These components were located inside the subject printer 130 in the first embodiment. The difference in operation from the first embodiment is that while in the first embodiment the execution of the information network monitoring program was performed by the subject printer 130, which is an information processing apparatus, in this embodiment it is performed by the information network monitoring apparatus 370.

The operation of this embodiment will now be explained. The basic operation of this embodiment also involves printing by one printer based on a request from the client 325. However, unlike the first embodiment, the processing in which the underutilized printer in the network 300 is identified and the issuance of print commands to this printer are carried out by the information network monitoring apparatus 370.

Figure 6:
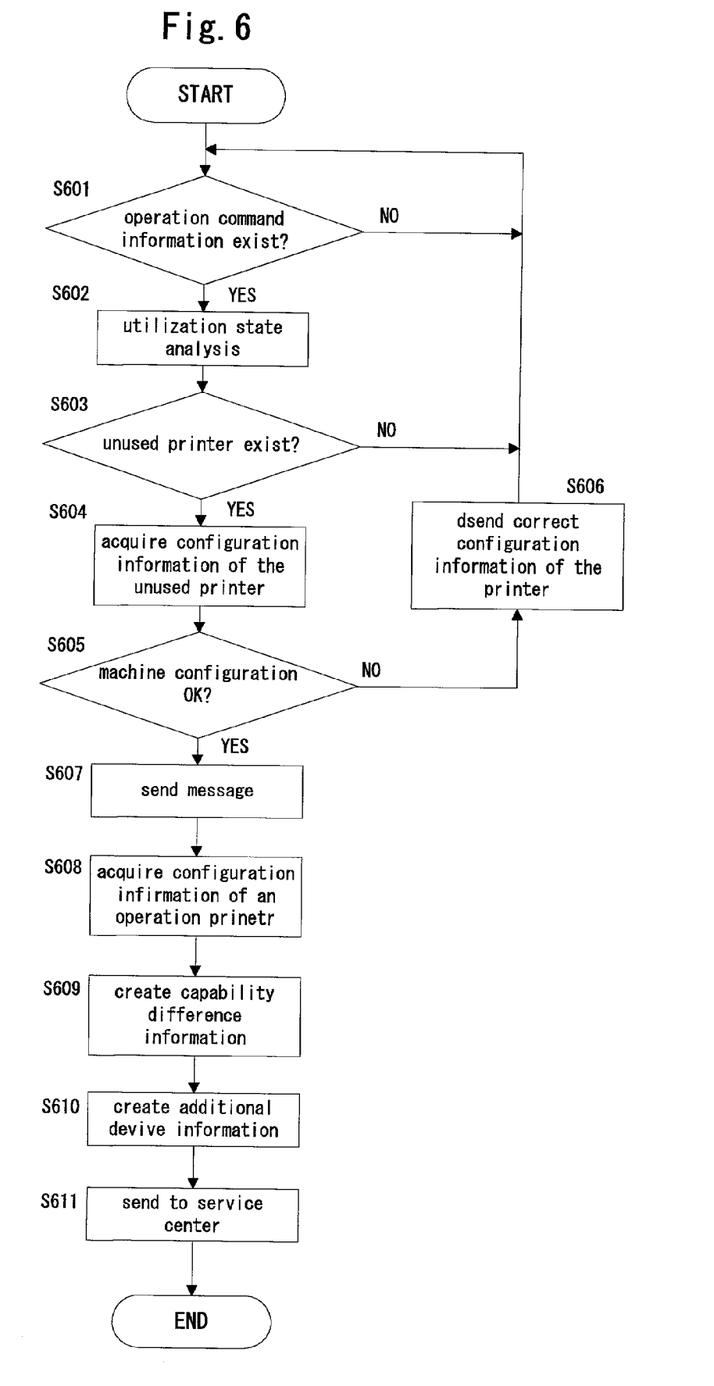
FIG. 6 is a flow chart of an information network monitoring apparatus pertaining to the third embodiment.

The control of this processing by the information network monitoring apparatus 370 will be now explained with reference to the flow chart of FIG. 6. The network server 310 first checks each printer connected to the network 300 on a periodic basis to obtain the hardware information, settings information, state information, etc. for each printer, and stores the information in the storage device 350. In the information network monitoring apparatus 370, the operation command detection unit 371 checks whether or not operation command information exists in the network 300 (S601). As used here, the term 'operation command information' refers to the print command and associated data that were issued by the client 325. Where operation command information exists (YES in S601), the machine utilization state analyzing unit 372 analyzes the utilization state of each printer connected to the network 300 (S602).

It is then determined whether or not an unused printer exists (S603). Where all of the printers are in use (NO in S603), the processing of S601 is returned to, and the information network monitoring apparatus 370 checks whether or not operation command information exists in the network 300. Where a currently unused printer exists (YES in S603), the information network monitoring apparatus 370 advances to S604. In this step, the printer identified as not in use is determined to be the underutilized printer. The explanation provided below assumes that the printer not in use is the subject printer 330. In S604, the configuration information for the subject printer 330 is obtained from the network server 310.

The machine configuration checking unit 373 checks whether or not the configuration information obtained regarding the subject printer 330 is erroneous. Where the configuration information is determined to be erroneous after checking (NO in S605), correct configuration information is created and sent to the network server 310 (S606). The fact that the information contains an error may also be sent to the external information collection base 340.

Where the configuration information does not contain an error, i.e., where the capabilities of the subject printer 330 are correctly recognized by the network 300 (YES in S605), a message that prompts the use of the subject printer 330 is sent to the network server 310 (S607), and the network server 310 receiving the message displays it on the display device 360. The message may also be sent to the client 325, or displayed on the transmission display unit 378 of the information network monitoring apparatus 370.

The configuration information acquiring unit 376 then obtains the configuration information for a printer that is currently in use among the printers 321 through 324 (S608). Based on the obtained configuration information, the capability difference detection unit 374 detects the differences in capability between the printer in use and the subject printer 330 from the configuration information for the subject printer 330 that is not in use, and creates capability difference information (S609). Furthermore, the additional apparatus information generating unit 375 creates information regarding additional apparatuses necessary in order to upgrade the performance of the unused subject printer 330 to a level equivalent to that of the other printer that is in use (S610). Finally, the thus created capability difference information and additional apparatus information is sent to the external information collection base 340 (S611), whereupon the processing ends. The analysis of the utilization state of the printers (S602) is performed approximately once per day, as in the first embodiment.

As described in detail above, in this embodiment, the operation command information detection unit 371 and the machine utilization state analyzing unit 372 check the utilization state of each printer in the network 300. Where a particular printer is not being used, the machine configuration checking unit 373 performs processing to verify the configuration information for that printer and prompt the use thereof. Where the printer configuration information is erroneous, the capability difference detection unit 374, additional apparatus information generating unit 375 and configuration information acquiring unit 376 perform processing to communicate that fact. The same effect as described with reference to the first embodiment may be expected through the processing of steps S606, S607 and S611 of FIG. 6. Through this processing, an information network monitoring program and information network monitoring apparatus that ensure appropriate utilization of each printer in the network 300 is realized in an information processing system in which operation command information is received over a network 300 and processing is performed based on that information.

These embodiments are mere examples, and do not limit the present invention in any way whatsoever. Therefore, the present invention may naturally be improved and modified in various ways within its essential scope. For example, in the processing of step S406 of the first embodiment, correct information is merely sent when the configuration information is erroneous, but it is also acceptable if the configuration information is forcibly replaced by the correct information. In addition, the information collection base 140 may be connected to the network. Furthermore, the configuration information for each printer that is managed by the network server 100 may be made revisable via the client 125. Moreover, the information processing apparatus is not limited to a printer, but may comprise an output apparatus such as a digital copying machine or facsimile machine, or an input apparatus such as a scanner.

As is clear from the above description, according to the present invention, appropriate utilization of each information processing apparatus may be ensured in an information processing system in which operation command information is issued from an information distribution device and in which the operation command information is received by one of multiple information processing apparatuses over an information network and processing is performed based on that information.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An information processing apparatus that receives operation command information from a network and performs processing based on such information, the information processing apparatus comprising:
   a first information acquiring unit that obtains first information regarding operation commands supplied to multiple information processing apparatuses connected to the network;
   a second information acquiring unit that obtains second information regarding the utilization of the information processing apparatus in which it resides;
   a utilization state analyzing unit that analyzes the state of utilization of the information processing apparatus in which it resides based on the first information obtained by the first information acquiring unit and the second information obtained by the second information acquiring unit; and
   an information sending unit that, based on the first information obtained by the results of the analysis by the utilization state analyzing unit, transmits prompt information that prompts an issuance of an operation command directed to the information processing apparatus in which it resides.

2. An information distribution apparatus that sends operation command information to a group of information processing apparatuses over a network and causes processing to be performed based on such information, the information distribution apparatus comprising:
   an information acquiring unit that obtains information regarding operation commands supplied by the information distribution apparatus to the multiple information processing apparatuses over the network;
   a utilization state analyzing unit that analyzes the state of utilization of the multiple information processing apparatuses based on the information obtained by the information acquiring unit;
   a determining device that identifies which information processing apparatus is underutilized based on the results of the analysis by the utilization state analyzing unit; and
   an information sending unit that sends prompt information that prompts an issuance of an operation command to the underutilized information processing apparatus identified by the determining device.

3. A network monitoring apparatus that monitors a network, the network connecting an information distribution apparatus that issues operation command information with a group of information processing apparatuses that receive operation command information and perform processing based on such information, the network monitoring apparatus comprising:

an information acquiring unit that obtains operation command information supplied to the multiple information processing apparatuses connected to the network;

a utilization state analyzing unit that analyzes the state of utilization of the multiple information processing apparatuses based on the information obtained by the information acquiring unit;

a determining device that identifies which information processing apparatus is underutilized based on the results of the analysis by the utilization state analyzing unit; and an information sending unit that sends prompt information that prompts an issuance of an operation command to the underutilized information processing apparatus identified by the determining unit.

4. An information processing system in which operation command information is issued by an information distribution apparatus and received by one of information processing apparatuses over a network and processing is performed based on such information, the information processing system comprising:

an information acquiring unit that obtains operation command information supplied to the multiple information processing apparatuses by the information distribution apparatus over the network;

a utilization state analyzing unit that analyzes the state of utilization of the multiple information processing apparatuses based on the information obtained by the information acquiring unit;

a determining device that identifies which information processing apparatus is underutilized based on the results of the analysis by the utilization state analyzing unit; and an information sending unit that sends prompt information that prompts an issuance of an operation command to the underutilized information processing apparatus identified by the determining unit.

5. An information processing system as claimed in claim 4, further comprising:

a configuration information acquiring unit that obtains configuration information that pertains to the capabilities of the underutilized information processing apparatus from the network, wherein said prompt information sent by the sending unit includes correction information to correct the configuration information when the configuration information obtained by the configuration information acquiring unit contains errors.

6. An information processing system as claimed in claim 4, wherein said prompt information sent by the information sending unit includes message information by which to cause a different apparatus connected to the network to display a message that urges the use of the underutilized information processing apparatus.

7. An information processing system as claimed in claim 4, further comprising:

an other apparatus information acquiring unit that obtains information regarding the capabilities of another information processing apparatus connected to the network.

8. An information processing system as claimed in claim 7, wherein said information sending unit creates, from the information obtained by said other apparatus information acquiring unit, capability difference information that indicates the differences in capability between the other information processing apparatus and the underutilized information processing apparatus, and sends the capability difference information as prompt information.

9. An information processing system as claimed in claim 7, wherein said information sending unit creates, from the information obtained by the other apparatus information acquiring unit, additional device information by which to upgrade the performance of the underutilized information processing apparatus to a level equivalent to that of the other information processing apparatus, and sends the additional device information as prompt information.

10. An information processing system as claimed in claim 4, wherein said information processing apparatus includes a printer.

11. A network monitoring program that manages a network to which are connected an information distribution apparatus that issues operation command information and a group of information processing apparatuses that receive the operation command information and perform processing based on such information, the network monitoring program comprising the steps of:

obtaining operation command information supplied to the multiple information processing apparatuses connected to the network;

analyzing the state of utilization of the multiple information processing apparatuses based on the obtained information;

identifying an underutilized information processing apparatus based on the results of the analysis; and issuing prompt information that prompts an issuance of an operation command to the identified underutilized information processing apparatus.

* * * * *